(12) United States Patent
Chen (10) Patent No.: US 9,686,334 B2
(45) Date of Patent: Jun. 20, 2017

(54) TRANSMISSION METHOD FOR MEDIA DATA STREAM AND THIN CLIENT

(71) Applicant: ZTE Corporation, Shenzhen, Guangdong (CN)

(72) Inventor: Hongling Chen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 243 days.

(21) Appl. No.: 14/412,826

(22) PCT Filed: Jul. 2, 2013

(86) PCT No.: PCT/CN2013/078684
§ 371 (c)(1),
(2) Date: Jan. 5, 2015

(87) PCT Pub. No.: WO2013/170812
PCT Pub. Date: Nov. 21, 2013

(65) Prior Publication Data
US 2015/0195318 A1    Jul. 9, 2015

(30) Foreign Application Priority Data

Sep. 5, 2012   (CN) .......................... 2012 1 0325236

(51) Int. Cl.
*G06F 15/16*      (2006.01)
*H04L 29/06*     (2006.01)
(Continued)

(52) U.S. Cl.
CPC .............. *H04L 65/60* (2013.01); *H04L 51/04* (2013.01); *H04L 65/1016* (2013.01);
(Continued)

(58) Field of Classification Search
CPC ..... H04L 65/60; H04L 67/1002; H04L 67/14; H04L 51/04; H04L 65/1069; H04L 67/04; H04L 65/1016
See application file for complete search history.

(56) References Cited

U.S. PATENT DOCUMENTS 6,108,715 A  *  8/2000  Leach .................... G06F 9/547
                                                              709/203
9,094,420 B2 *  7/2015  Matula ................ H04L 65/1006
(Continued)

FOREIGN PATENT DOCUMENTS

| CN | 102307153 A | 1/2012 |
|---|---|---|
| CN | 102308560 A | 1/2012 |
| CN | 102611809 A | 7/2012 |

OTHER PUBLICATIONS

Supplementary European Search Report in European application No. 13790066.8, mailed on Jun. 18, 2015.
(Continued)

*Primary Examiner* — Krisna Lim
(74) *Attorney, Agent, or Firm* — Oppedahl Patent Law Firm LLC (57) ABSTRACT

Disclosed are a method for transmitting a media data stream and a thin client, and the method includes: a media channel is established between a first thin client and a second thin client, wherein a first media module is pre-configured in the first thin client and a second media module is pre-configured in the second thin client; and the media data stream is transmitted between the first media module pre-configured in the first thin client and the second media module pre-configured in the second thin client through the media channel. The present disclosure solves problems of network time delay and data distortion caused by a fact in the prior art that media data need to be transmitted between a thin client and a virtual desktop through using a protocol such as
(Continued)

RDP so as to implement interaction of data between two thin clients, thus achieving technical effectives of improvement on the data transmission rate and accuracy of data.

12 Claims, 3 Drawing Sheets

(51) Int. Cl.
*H04L 29/08* (2006.01)
*H04L 12/58* (2006.01)

(52) U.S. Cl.
CPC .......... *H04L 65/1069* (2013.01); *H04L 67/04* (2013.01); *H04L 67/1002* (2013.01); *H04L 67/14* (2013.01)

(56) References Cited

U.S. PATENT DOCUMENTS

| | | | |
|---|---|---|---|
| 9,137,163 B2 * | 9/2015 | Perryman | H04L 47/125 |
| 2011/0138069 A1 | 6/2011 | Momchilov | |
| 2011/0145431 A1 | 6/2011 | Momchilov | |
| 2012/0218374 A1 | 8/2012 | Matula | |

OTHER PUBLICATIONS

International Search Report in international application No. PCT/CN2013/078684, mailed on Oct. 17, 2013.
English Translation of the Written Opinion of the International Search Authority in international application No. PCT/CN2013/078684, mailed on Oct. 17, 2013.

* cited by examiner

TRANSMISSION METHOD FOR MEDIA DATA STREAM AND THIN CLIENT

TECHNICAL FIELD

The disclosure relates to the field of communications, and in particular to a method for transmitting a media data stream and a thin client.

BACKGROUND

At present the Internet is fairly popular, Instant Messaging (IM) services based on Voice over Internet Protocol (VoIP) are integrated into more and more devices. VoIP's greatest advantage is that the Internet and a globally IP-connected environment can be used to provide more and better services compared to traditional services.

In addition, with the development of cloud computing in recent years, a cloud platform provides various services with new vigor, enhances performance of service, lowers cost for providing service and also lowers requirements on terminals.

When IM services are deployed on a cloud platform and a user accesses an IM application through a thin client, there may be a problem that media time delay is inevitably exacerbated due to the system architecture.

Figure 1:
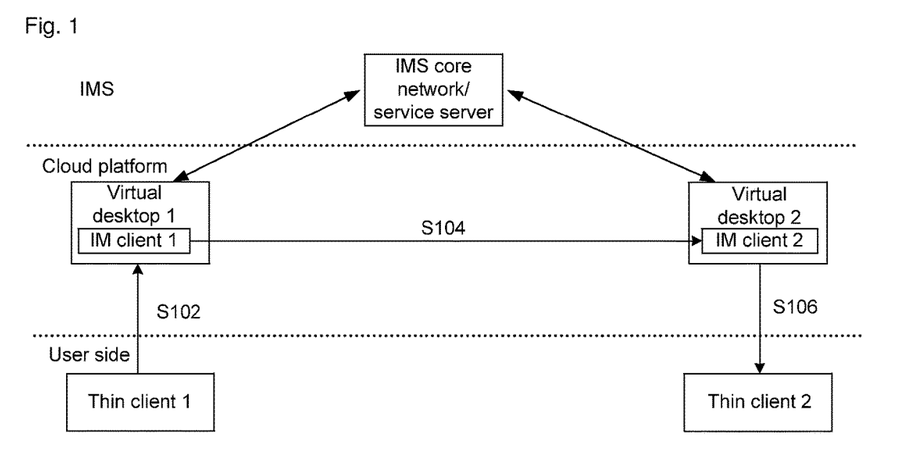
FIG. 1 is a flow chart of transmitting an media data stream according to a prior art.

At present a VoIP service media stream and signaling stream in a cloud platform environment mainly include: a user A accesses an IM client 1 software running in a virtual desktop through a thin client 1. Operations performed by the user on peripherals on the thin client are transmitted to the IM software in the virtual desktop according to a virtual desktop transmission protocol, and the peripherals may include a keyboard, mouse, microphone, camera and the like, the virtual desktop transmission protocol may include an Independent Computing Architecture (ICA) protocol, a PC-over-IP (PCoIP), a Simple Protocol for Independent Computing Environment (SPICE), a Remote Desktop Protocol (RDP) and the like. Local data collected by an earphone/camera is also transmitted by the thin client 1 to an IM client in the virtual desktop through the virtual desktop transmission protocol and the earphone/camera receives an audio/video media stream transmitted from the opposite end. As shown in FIG. 1, transmitting a media stream from a calling side to a called user side includes the following steps:

Step S102, an audio/video media stream is transmitted from a thin client 1 of the calling side to a virtual desktop 1, and the virtual desktop 1 forwards the media stream to an IM client 1.

Step S104, the IM client 1 forwards the media stream to an IM client 2 of the called side, and the IM client 2 forwards the media stream to a virtual desktop 2 of the called side.

Step S106, the virtual desktop 2 then forwards the media stream to a thin client 2.

Particularly in an IP Multimedia Subsystem (IMS) network environment, there are a number of media streams desired to be transmitted, thus a problem regarding time delay becomes apparent; furthermore, too many forwards readily result in distortion of data. To sum up, the calling side and the called side can converse with each other only after several transmission of the media stream, but aforementioned several forwards of the media stream occupy network bandwidth and exacerbates time delay of the network, and distortion of the audio/video may be resulted in due to many forwarding and encoding/decoding processes involved.

Hitherto no effective solutions have been proposed to solve the above problem.

SUMMARY

The present disclosure provides a method for transmitting a media data stream and a thin client so as to at least solve problems of network time delay and data distortion caused by a fact in the prior art that media data need to be transmitted between a thin client and a virtual desktop through using a protocol such as RDP so as to implement interaction of data between two thin clients.

According to one aspect of embodiments of the present disclosure, provided is a method for transmitting a media data stream, which includes: a media channel is established between a first thin client and a second thin client, wherein a first media module is pre-configured in the first thin client and a second media module is pre-configured in the second thin client; and the media data stream is transmitted between the first media module pre-configured in the first thin client and the second media module pre-configured in the second thin client through the media channel.

Preferably, before the media channel is established between the first thin client and the second thin client, the method may further include: the first thin client initiates a call request to the second thin client through a first Instant Messaging (IM) client corresponding to the first thin client, and the first thin client receives an IP address and a port number of the second media module returned by a second IM client corresponding to the second thin client in response to the call request, wherein the IP address and port number of the second media module may be for establishing the media channel between the first thin client and the second thin client.

Preferably, an IP address and a port number of the first media module may be carried in the call request.

Preferably, the initiating by the first thin client a call request to the second thin client through a first IM client corresponding to the first thin client may include: authentication is performed between the first thin client and the first IM client; and after success of the authenticating and pairing, the first thin client initiates the call request to the second thin client through the first IM client.

Preferably, after the authentication between the first thin client and the first IM client, the method may further include: a Transmission Control Protocol (TCP) link is established between the first thin client and the first IM client, wherein the TCP link may be configured for the first IM client to send the IP address and port number of the second media module to the first thin client.

Preferably, the transmitting the media data stream between the first media module pre-configured in the first thin client and the second media module pre-configured in the second thin client through the media channel may include: the first media module encodes locally-collected audio/video content; the first media module regards the encoded audio/video content as the media data stream; and the first media module transmits the media data stream directly to the second media module through the media channel, wherein the second media module may decode received media data stream to restore the audio/video content.

According to another aspect of embodiments of the disclosure, provided is a thin client, which includes: an establishment module configured to establish a media channel between the thin client and another thin client, and a media module configured to transmit a media data stream between the media module and a media module of the another thin client through the media channel.

Preferably, the thin client may further include: a call module configured to initiate a call request to the another thin client through a first IM client corresponding to the thin client before the media channel is established between the thin client and another thin client, and a reception module configured to receive an IP address and a port number of the media module of the another thin client returned by a second IM client corresponding to the another thin client in response to the call request, wherein the IP address and port number of the media module of the another thin client may be for establishing the media channel between the thin client and the another thin client.

Preferably, the call module may include: an authentication unit configured to perform authentication between the thin client and the first IM client, and a call unit configured to initiate the call request to the another thin client through the first IM client after success of the authentication.

Preferably, the media module may include: an encoding unit configured to encode locally-collected audio/video content; a generation unit configured to regard the encoded audio/video content as the media data stream; and a transmission unit configured to transmit the media data stream directly to the media module of the other thin client through the media channel, wherein the media module of the another thin client decodes received media data stream to restore the audio/video content.

In embodiments of the disclosure, a media module is pre-configured in a thin client, thus a media channel for transmitting a media data stream is directly established between a first thin client and a second thin client and the media data stream can be directly transmitted between thin clients without being forwarded through a cloud desktop and the like, therefore the above method solves problems of network time delay and data distortion caused by a fact in the prior art that media data need to be transmitted between a thin client and a virtual desktop through using a protocol such as RDP so as to implement interaction of data between two thin clients, thus achieving technical effectives of improvement on the data transmission rate and accuracy of data.

DETAILED DESCRIPTION

The disclosure will be elaborated below with reference to accompanying drawings in combination with embodiments. It should be noted that embodiments of the disclosure and features in the embodiments can be combined with each other in case of no conflicts.

Figure 2:
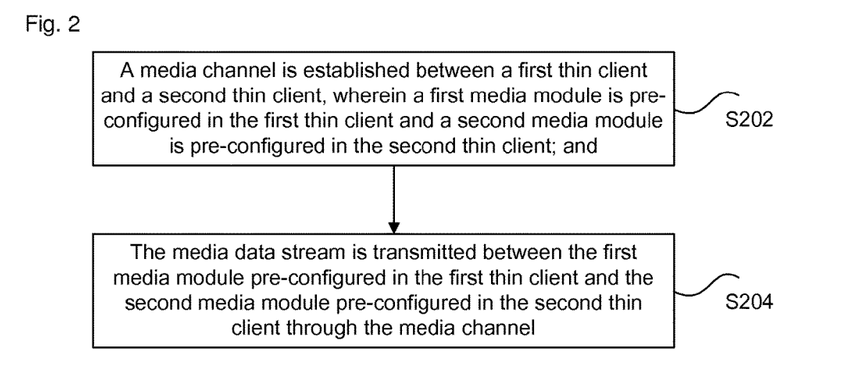
FIG. 2 is a preferred flow chart of a method for transmitting a media data stream according to an embodiment of the disclosure.

Embodiments of the disclosure provide a preferred method for transmitting a media data stream and as shown in FIG. 2 the method includes the following steps:

step S202, a media channel is established between a first thin client and a second thin client, wherein a first media module is pre-configured in the first thin client and a second media module is pre-configured in the second thin client; and step S204, the media data stream is transmitted between the first media module pre-configured in the first thin client and the second media module pre-configured in the second thin client through the media channel.

In above preferred embodiment, a media module is pre-configured in a thin client, thus a media channel for transmitting a media data stream is directly established between a first thin client and a second thin client and the media data stream can be directly transmitted between thin clients without being forwarded through a cloud desktop and the like, therefore the above method solves problems of network time delay and data distortion caused by a fact in the prior art that media data need to be transmitted between a thin client and a virtual desktop through using a protocol such as RDP so as to implement interaction of data between two thin clients, thus achieving technical effectives of improvement on the data transmission rate and accuracy of data.

Though media stream data can be transmitted directly between thin clients, an establishment of a call still needs to be controlled by an Instant Messaging (IM) client on a cloud platform. In a preferred embodiment, before the media channel is established between the first thin client and the second thin client, the method may further include a process of establishing a call, preferably, the process may include: the first thin client initiates a call request to the second thin client through a first IM client corresponding to the first thin client, and the first thin client receives an IP address and a port number of the second media module returned by a second IM client corresponding to the second thin client in response to the call request, wherein the IP address and port number of the second media module may be for establishing the media channel between the first thin client and the second thin client. In other words, the first thin client initiates the call request through the first IM client and then acquires the IP address and port number of the media module of the second thin client so that the media channel can be established in according with an acquired IP address and port number after a corresponding IP address and port number are acquired.

Certainly, the second thin client also needs an IP address and port number of the media module of the first thin client, preferably, the first thin client can have the IP address and port number of the first media module carried in the call request so as to notify the second thin client of them. It should be noted that though what described above are an IP address and port number of a media module in the above description, they actually correspond to an IP address and port number of a client itself.

In order to ensure correspondence relationship between a thin client and an IM client, paring can be performed before a call request is sent, i.e., the thin client needs to find its corresponding IM client. In a preferred embodiment, the initiating by the first thin client a call request to the second thin client through a first IM client corresponding to the first thin client may include: authentication and pairing are performed between the first thin client and the first IM client; and after success of the authenticating and pairing, the first thin client initiates the call request to the second thin client through the first IM client.

It can be seen from above description that an IP address and port number need to be transmitted in the preferred embodiment, including both transmission of a uplink IP address and port number and transmission of a downlink IP address and port number, therefore a Transmission Control Protocol (TCP) channel dedicated to transmission of the IP address and port number can be established between the thin client and the IM client. In a preferred embodiment, after the authenticating and pairing between the first thin client and the first IM client, the method may further to include: a Transmission Control Protocol (TCP) link is established between the first thin client and the first IM client, wherein the TCP link may be configured for the first IM client to send the IP address and port number of the second media module to the first thin client.

Figure 3:
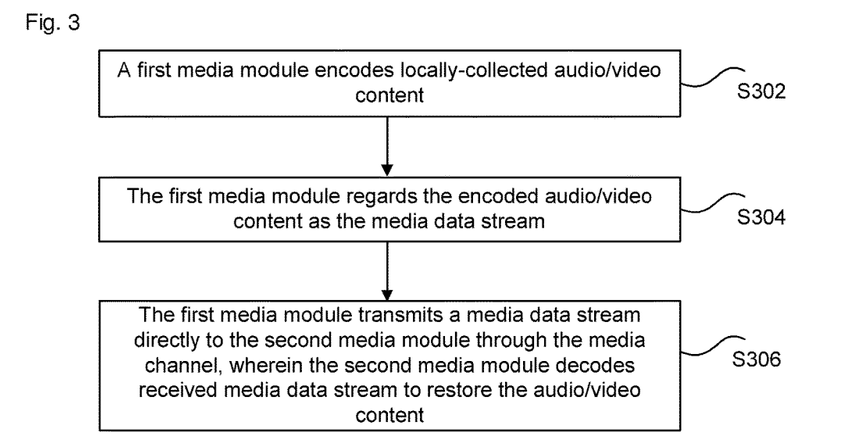
FIG. 3 is another preferred flow chart of a method for transmitting a media data stream according to an embodiment of the disclosure.

Since an approach described in the embodiment is to pre-configure a media module in the thin client, interaction of a media stream is implemented between media modules; in a preferred embodiment as shown in FIG. 3, the step of transmitting the media data stream between the first media module pre-configured in the first thin client and the second media module pre-configured in the second thin client through the media channel may include:

step S302, a first media module encodes locally-collected audio/video content;

step S304, the first media module regards the encoded audio/video content as the media data stream; and step S306, the first media module transmits a media data stream directly to the second media module through the media channel, wherein the second media module decodes received media data stream to restore the audio/video content.

Figure 4:
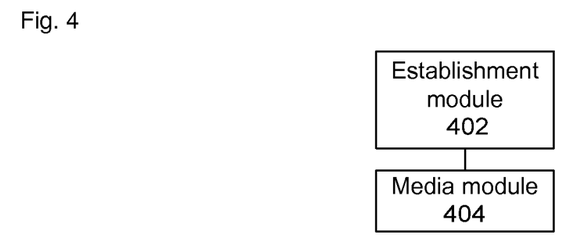
FIG. 4 is a preferred structural diagram of a thin client according to an embodiment of the disclosure.

The embodiment further provides a thin client configured to implement aforementioned embodiments and preferred embodiments, and the detailed description thereof will be omitted for simplicity. As used below, terms "unit" or "module" can be a combination of a software and/or hardware implementing a predetermined function. Though a device described by embodiments below is preferably implemented by a software, it may be contemplated to implement it by a hardware or a combination of a software and a hardware. FIG. 4 is another preferred structural diagram of a thin client according to an embodiment of the disclosure, as shown in FIG. 4, the thin client includes an establishment module 402 and a media module 404, and the structure thereof will be described as follows.

The establishment module 402 is configured to establish a media channel between the thin client and another thin client; and the media module 404 is configured to transmit a media data stream between the media module and a media module of the another thin client through the media channel.

Figure 5:
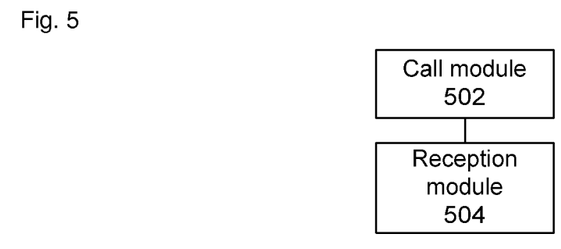
FIG. 5 is another preferred structural diagram of a thin client according to an embodiment of the disclosure.

In a preferred embodiment as shown in FIG. 5, the thin client may further include:

a call module 502 configured to initiate a call request to the another thin client through a first Instant Messaging (IM) client corresponding to the thin client before the media channel is established between the thin client and another thin client;

a reception module 504 configured to receive an IP address and a port number of the media module of the another thin client returned by a second IM client corresponding to the another thin client in response to the call request, wherein the IP address and port number of the media module of the another thin client is for establishing the media channel between the thin client and the another thin client.

Figure 6:
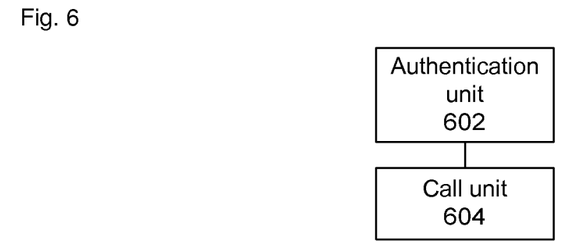
FIG. 6 is a preferred structural diagram of a call module in a thin client according to an embodiment of the disclosure.

In a preferred embodiment as shown in FIG. 6, the call module may include: an authentication unit 602 configured to authenticate and pair between the thin client and the first IM client, and a call unit 604 configured to initiate the call request to the another thin client through the first IM client after success of the authenticating and pairing.

Figure 7:
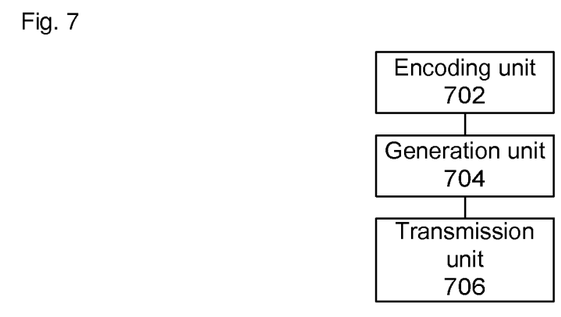
FIG. 7 is a preferred structural diagram of a call module in a thin client according to an embodiment of the disclosure.

In a preferred embodiment as shown in FIG. 7, the media module may include: an encoding unit 702 configured to encode locally-collected audio/video content; a generation unit 704 configured to regard the encoded audio/video content as the media data stream; and a transmission unit 706 configured to transmit the media data stream directly to the media module of the another thin client through the media channel, wherein the media module of the another thin client decodes received media data stream to restore the audio/video content.

A preferred embodiment is provided to further explain the disclosure, but it should be noted that the embodiment is only used to better describe the disclosure instead of being regarded as a limitation.

Aiming at disadvantages of occupying network bandwidths and exacerbating a network time delay during transmission of an audio/video media stream in a cloud desktop of related techniques, embodiments of the disclosure propose a new method for transmitting a media data stream, the core spirit of which is to separate the media and control so that the structure of an existing VoIP terminal is optimized so as to solve problems of time delay and distortion to the greatest extent.

In combination with a relatively widely-used virtual cloud desktop system, embodiments of the disclosure adjust the architecture of an existing IM application, and the adjustment mainly includes:

1) a media module is deployed on a thin client so as to be mainly in charge of encoding and decoding of an audio/video media stream;

2) an IM client application deployed on a virtual desktop is only in charge of signaling control during a session;

3) a media module on a thin client used by a user needs to be paired successfully with its corresponding IM client in the virtual desktop; and 4) the IM client in the cloud desktop is in charge of call control, and a media stream is directly interacted between thin clients, it is no longer transmitted between the thin client and the virtual desktop through a virtual desktop transmission protocol (such as ICA, PcoIP, SPICE, DRP and the like), thus avoiding disadvantages including time delay, distortion and occupying of bandwidths due to RDP transmission.

Figure 8:
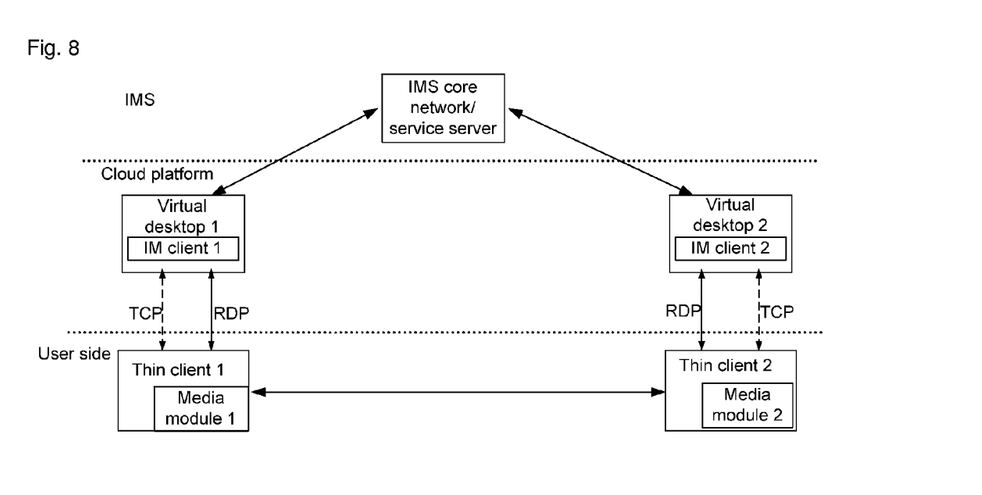
FIG. 8 is a schematic architecture of a VoIP service system according to an embodiment of the disclosure.

As shown in FIG. 8, systems involved in the embodiment mainly include a thin client 1, thin client 2, media module 1, media module 2, virtual desktop 1, virtual desktop 2, IM client 1, IM client 2, an IP Multimedia Subsystem (IMS) core network and an IM server. Specifically, the media module 1 is deployed on the thin client 1, the media module 2 is deployed on the thin client 2, and after respective thin clients are powered on or off, respective media modules automatically operate or stop.

The embodiment of the disclosure include two processes: a) pairing between a thin client and an IM client; b) reconstruction of a session process; and the two processes are specifically described as follows.

The pairing process mainly includes the following steps:

S1, after a user A powers on a thin client 1, a media module 1 registers local information on an IM server, wherein the local information includes a user account, IP 1, Port 1 and ThinTag. In the meanwhile, the thin client 1 enables TCP listening on a local port.

S2, when the user A accesses the IM client 1 of a virtual desktop through a thin client, the IM client 1 queries the IM server whether the user uses a thin client to access the cloud desktop and queries the IM server for related information of the current thin client including mainly local information reported by the thin client.

S3, after successful pairing between the thin client 1 (media module 1) used by the user A and the IM client 1, a TCP connection is established, in this way, conditions for transmitting a media stream according to embodiments of the disclosure are met.

Based on the same mechanism, above pairing is also implemented between a thin client 2 (media module 2) used by a user B and an IM client 2, and then a TCP connection is established.

The reconstruction of a session process mainly includes:

S1, when the user A operates the IM client 1 to initiate a call, a Session Description Protocol (SDP) originally carried in a call invite is reconstructed to an IP address and port of the thin client 1; when the call invite arrives at the IM client 2, a 180 Ring response returned by the IM client 2 carries media information of the thin client 2 (IP, Port).

S2, the IM client 1 and the IM client 2 implement signaling interaction, a media channel is established between the thin client 1 (media module 1) and the thin client 2 (media module 2) for conducting a session.

In the preferred embodiment, the IM client in the cloud desktop is in charge of call control, and a media stream is directly interacted between thin clients, it is no longer transmitted between the thin client and the virtual desktop through a virtual desktop transmission protocol, thus avoiding disadvantages including time delay, distortion and occupying of bandwidths due to RDP transmission.

Figure 9:
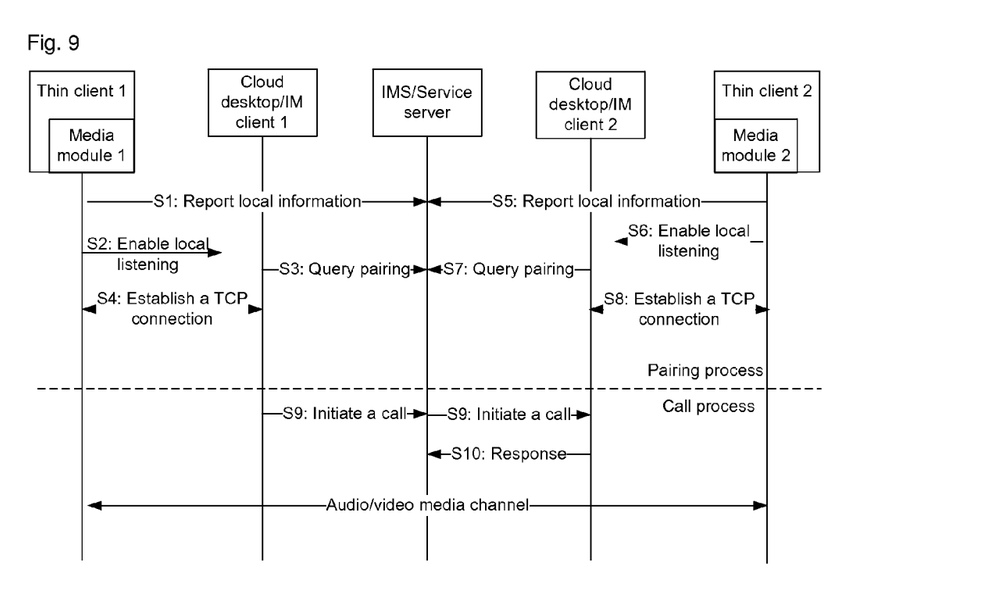
FIG. 9 is an interaction diagram showing transmission of a media data stream according to an embodiment of the disclosure.

FIG. 9 is a complete interaction diagram when a media data stream is transmitted according to the preferred embodiment.

Specifically, a pairing process between a thin client and an IM client includes:

Steps S1-S2, after a user A powers on a thin client 1, a media module 1 registers local information on an IM server (such as a user account, IP 1, Port 1 and ThinTag), in the meanwhile, the thin client 1 enables TCP listening on a local port.

Step S3, when the user A accesses the IM client 1 of a virtual desktop through a thin client, the IM client 1 queries the IM server whether the user uses a thin client to access the cloud desktop and queries the IM server for information of the current thin client (IP, Port, ThinTag).

Step S4, after successful pairing between the thin client 1 (media module 1) and the IM client, a TCP link is established that is used to deliver a negotiated media address and port number of the opposite end during a session negotiation.

Steps S5-S8, based on the same mechanism as above steps S1-S4, above pairing is also implemented between a thin client 2 (media module 2) used by a user B and an IM client 2.

After successful pairing between above thin clients and IM clients, preparatory conditions for the separation of the media and control will be met when a subsequent practical session is conducted.

A reconstructed session process includes:

Step S9, when the user A operates the IM client 1 to initiate a call, an IP address and port of the thin client 1 are carried in a call invite.

Step S10, when the call invite arrives at the IM client 2, a 180 Ring response returned by the IM client 2 carries media information of the thin client 2 (IP, Port).

After the user B hears the ring, he/she starts to answer or pick up, the IM client delivers media information of the opposite end to a successfully-paired thin client. After a media module of the thin client acquires the media information of the opposite end, a media channel is established so that a session media link between both sides is established. The media module of the thin client is in charge of collecting a local audio/video and delivering it to the opposite end, and receiving an audio/video media stream from the opposite end and then restoring an audio/video thereof.

In the complete and new mechanism for processing an audio/video session by an IM software in a virtual desktop, a communication approach separating the media and control is used, a call control end is still an IM client in the cloud desktop, but media information (equivalent to the media data stream above) is interacted on a thin client on the user side, thus avoiding effectively disadvantages of network time delay and media distortion caused by turnover of the media passing through the virtual cloud desktop. Furthermore, it can be readily implemented with respect to the architecture, which only involves deployment of a media module on a thin client without adding or deletion of hardwares of the system. Preferably, for messages with not huge data volumes such as an instant message, file transmission, contacts list and chat room, they can be processed according to the existing approach, i.e. processed through an IM client in a cloud desktop.

In another embodiment, a software is further provided that is configured to implement above embodiments and technical solutions described in preferred embodiments.

In another embodiment, a storage medium is further provided in which above software is stored, and the storage medium includes but is not limited to an optical disk, floppy disk, hard disk, erasable storage and the like.

From above description, it can be seen that embodiments of the disclosure implement below technical effects: a media module is pre-configured in a thin client, thus a media channel for transmitting a media data stream is directly established between a first thin client and a second thin client and the media data stream can be directly transmitted between thin clients without being forwarded through a cloud desktop and the like, therefore the above method solves problems of network time delay and data distortion caused by a fact in the prior art that media data need to be transmitted between a thin client and a virtual desktop through using a protocol such as RDP so as to implement interaction of data between two thin clients, thus achieving technical effectives of improvement on the data transmission rate and accuracy of data.

Apparently, it should be appreciated by those skilled in the art that various modules and steps of above embodiments of the disclosure can be implemented by a general-purpose computing device, and they may be integrated into an individual computing device or distributed on a network consisting of multiple computing devices; optionally, they can be implemented by program codes executable by a computing device so that they can be stored in a storage device so as to be implemented by a computing device, and in some cases, steps shown and described may be implemented in an order different from what described herein, or they can be implemented by being made as respective IC modules or by some modules or steps therein being made as individual IC modules. In this way, the embodiments of the disclosure are not limited to any specific combinations of a hardware and a software.

What described are merely preferable embodiments of the disclosure and are not intended to limit the disclosure, and numerous modifications and variations will be apparent to those skilled in the art. All modifications, replacements and improvements made within the spirit and principles of the disclosure should be included within the scope of protection of the disclosure.

The invention claimed is:

1. A method for transmitting a media data stream, comprising:
   establishing a media channel between a first thin client and a second thin client, wherein a first media module is pre-configured in the first thin client and a second media module is pre-configured in the second thin client, wherein the first media module and the second media module are in charge of encoding and decoding of the media data stream; and
   transmitting the media data stream between the first media module pre-configured in the first thin client and the second media module pre-configured in the second thin client through the media channel;
   wherein before the step of establishing a media channel between a first thin client and a second thin client, the method further comprising:
   initiating, by the first thin client, a call request to the second thin client through a first Instant Messaging (IM) client corresponding to the first thin client; and
   receiving, by the first thin client, an IP address and a port number of the second media module returned by a second IM client corresponding to the second thin client in response to the call request, wherein the IP address and port number of the second media module is for establishing the media channel between the first thin client and the second thin client.

2. The method according to claim 1, wherein an IP address and a port number of the first media module are carried in the call request.

3. The method according to claim 2, wherein the step of transmitting the media data stream between the first media module pre-configured in the first thin client and the second media module pre-configured in the second thin client through the media channel, comprises:
   encoding, by the first media module, locally-collected audio/video content;
   regarding, by the first media module, the encoded audio/video content as the media data stream; and
   transmitting, by the first media module, the media data stream directly to the second media module through the media channel, wherein the second media module decodes the received media data stream to restore the audio/video content.

4. The method according to claim 1, wherein the step of initiating, by the first thin client, a call request to the second thin client through a first IM client corresponding to the first thin client, comprises:
   authenticating and pairing between the first thin client and the first IM client; and
   after success of the authenticating and pairing, initiating, by the first thin client, the call request to the second thin client through the first IM client corresponding to) the first thin client.

5. The method according to claim 4, after the step of authenticating and pairing between the first thin client and the first IM client, the method further comprising
   establishing a Transmission Control Protocol (TCP) link between the first thin client and the first IM client, wherein the TCP link is configured for the first IM client to send the IP address and port number of the second media module to the first thin client.

6. The method according to claim 5, wherein the step of transmitting the media data stream between the first media module pre-configured in the first thin client and the second media module pre-configured in the second thin client through the media channel, comprises:
   encoding, by the first media module, locally-collected audio/video content;
   regarding, by the first media module, the encoded audio/video content as the media data stream; and
   transmitting, by the first media module, the media data stream directly to the second media module through the media channel, wherein the second media module decodes the received media data stream to restore the audio/video content.

7. The method according to claim 4, wherein the step of transmitting the media data stream between the first media module pre-configured in the first thin client and the second media module pre-configured in the second thin client through the media channel, comprises:
   encoding, by the first media module, locally-collected audio/video content;
   regarding, by the first media module, the encoded audio/video content as the media data stream; and
   transmitting, by the first media module, the media data stream directly to the second media module through the media channel, wherein the second media module decodes the received media data stream to restore the audio/video content.

8. The method according to claim 1, wherein the step of transmitting the media data stream between the first media module pre-configured in the first thin client and the second media module pre-configured in the second thin client through the media channel, comprises:
   encoding, by the first media module, locally-collected audio/video content;
   regarding, by the first media module, the encoded audio/video content as the media data stream; and
   transmitting, by the first media module, the media data stream directly to the second media module through the media channel, wherein the second media module decodes the received media data stream to restore the audio/video content.

9. A thin client comprising:
   an establishment module configured to establish a media channel between the thin client and another thin client; and
   a media module configured to transmit a media data stream between the media module and a media module of the another thin client through the media channel, wherein the media module is in charge of encoding and decoding of the media data stream;

wherein the thin client further comprises:

a call module configured to initiate a call request to the another thin client through a first Instant Messaging (IM) client corresponding to the thin client before the media channel is established between the thin client and the another thin client;

a reception module configured to receive an IP address and a port number of the media module of the another thin client returned by a second IM client corresponding to the another thin client in response to the call request, wherein the IP address and port number of the media module of the another thin client is for establishing the media channel between the thin client and the another thin client.

10. The thin client according to claim 9, wherein the call module comprises:

an authentication unit configured to authenticate and pair between the thin client and the first IM client; and a call unit configured to initiate the call request to the another thin client through the first IM client after success of the authenticating and pairing.

11. The thin client according to claim 10, wherein the media module comprises:

an encoding unit configured to encode locally-collected audio/video content;

a generation unit configured to regard the encoded audio/video content as the media data stream; and a transmission unit configured to transmit the media data stream directly to the media module of the another thin client through the media channel, wherein the media module of the another thin client decodes the received media data stream to restore the audio/video content.

12. The thin client according to claim 9, wherein the media module comprises:

an encoding unit configured to encode locally-collected audio/video content;

a generation unit configured to regard the encoded audio/video content as the media data stream; and a transmission unit configured to transmit the media data stream directly to the media module of the another thin client through the media channel, wherein the media module of the another thin client decodes the received media data stream to restore the audio/video content.

* * * * *